US012707282B2

(12) United States Patent
Lee et al.

(10) Patent No.: US 12,707,282 B2
(45) Date of Patent: Aug. 11, 2026

(54) METHOD AND APPARATUS FOR EVALUATING SERVICE TIME FOR AN NTN CELL IN A WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 18/569,562

(22) PCT Filed: Mar. 3, 2022

(86) PCT No.: PCT/KR2022/003002
§ 371 (c)(1),
(2) Date: Dec. 12, 2023

(87) PCT Pub. No.: WO2023/013833
PCT Pub. Date: Feb. 9, 2023

(65) Prior Publication Data

US 2024/0284194 A1 Aug. 22, 2024

(30) Foreign Application Priority Data

Aug. 3, 2021 (KR) ........................ 10-2021-0102070

(51) Int. Cl.
*H04W 16/28* (2009.01)
*H04W 48/20* (2009.01)
(Continued)

(52) U.S. Cl.
CPC ........... *H04W 16/28* (2013.01); *H04W 48/20* (2013.01); *H04W 64/006* (2013.01); *H04W 84/06* (2013.01)

(58) Field of Classification Search
CPC ... H04W 16/28; H04W 48/20; H04W 64/006; H04W 84/06
(Continued)

(56) References Cited

U.S. PATENT DOCUMENTS 5,884,164 A * 3/1999 Gerard .............. H04B 7/18558 455/12.1
6,122,507 A * 9/2000 Gerard .............. H04B 7/18541 455/12.1
(Continued)

OTHER PUBLICATIONS

PCT International Application No. PCT/KR2022/003002, International Search Report dated Jun. 9, 2022, 3 pages.
(Continued)

*Primary Examiner* — Michael R Neff
(74) *Attorney, Agent, or Firm* — LEE, HONG, DEGERMAN, KANG & WAIMEY

(57) ABSTRACT

A method and apparatus for evaluating service time for an NTN cell in a wireless communication system is provided. A wireless device may receive, from a network, cell coverage information for a Non-Terrestrial Networks (NTN) cell. The wireless device may receive, calculate a remaining service trace. The wireless device may evaluate remaining service time for the NTN cell based on the remaining service trace. The wireless device may determine whether to perform a mobility to the NTN cell.

20 Claims, 18 Drawing Sheets

(51) Int. Cl.
*H04W 64/00* (2009.01)
*H04W 84/06* (2009.01)

(58) Field of Classification Search
USPC .......................................................... 455/427
See application file for complete search history.

(56) References Cited

U.S. PATENT DOCUMENTS

| | | | | |
|---|---|---|---|---|
| 10,588,029 | B1 * | 3/2020 | Kay | H04W 16/28 |
| 2010/0113021 | A1 * | 5/2010 | Vare | H04W 64/003<br>455/436 |
| 2015/0310348 | A1 * | 10/2015 | Dessouky | G06N 7/01<br>706/52 |
| 2020/0049512 | A1 * | 2/2020 | Milici | G01C 21/3841 |
| 2021/0068013 | A1 | 3/2021 | Cheng | |
| 2022/0110049 | A1 * | 4/2022 | Wang | H04W 48/16 |

OTHER PUBLICATIONS

LG Electronics Inc., "Cell reselection based on time and location condition," 3GPP TSG-RAN WG2 Meeting #114-e, R2-2105786, May 2021, 6 pages.
LG Electronics Inc., "Further consideration on NTN CHO," 3GPP TSG-RAN WG2 Meeting #114-e, R2-2105787, May 2021, 4 pages.
MediaTek et al., "On Cell Re-selection in NR-NTN," 3GPP TSG-RAN WG2 Meeting #114-e, R2-2105251, May 2021, 4 pages.
InterDigital, "Location-based CHO in NTN," 3GPP RAN WG2 Meeting #114e, R2-2106045, May 2021, 3 pages.
European Patent Office Application Serial No. 22853214.9, Search Report dated Jun. 2, 2025, 12 pages.
LG Electronics Inc., "Beam type-related information of LEO satellite," 3GPP TSG-RAN WG2 Meeting #112-e, R2-2100578, Feb. 2021, 3 pages.
LG Electronics Inc., "Contents of ephemeris including beam type information," 3GPP TSG-RAN WG2 Meeting #113bis-e, R2-2103307, Apr. 2021, 5 pages.

* cited by examiner

METHOD AND APPARATUS FOR EVALUATING SERVICE TIME FOR AN NTN CELL IN A WIRELESS COMMUNICATION SYSTEM

CROSS-REFERENCE TO RELATED APPLICATION(S)

This application is the National Stage filing under 35 U.S.C. 371 of International Application No. PCT/KR2022/003002, filed on Mar. 3, 2022, which claims the benefit of earlier filing date and right of priority to Korean Application No. 10-2021-0102070, filed on Aug. 3, 2021, the contents of which are all incorporated by reference herein in their entirety.

TECHNICAL FIELD

The present disclosure relates to a method and apparatus for evaluating service time for an NTN cell in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)- 2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Thanks to the wide service coverage capabilities and reduced vulnerability of space/airborne vehicles to physical attacks and natural disasters, non-terrestrial networks (NTN) are expected to:

- foster the roll out of 5G service in un-served areas that cannot be covered by terrestrial 5G network (isolated/remote areas, on board aircrafts or vessels) and under-served areas (e.g., sub-urban/rural areas) to upgrade the performance of limited terrestrial networks in cost effective manner,
- reinforce the 5G service reliability by providing service continuity for machine-to-machine (M2M)/Internet-of-things (IoT) devices or for passengers on board moving platforms (e.g., passenger vehicles-aircraft, ships, high speed trains, bus) or ensuring service availability anywhere especially for critical communications, future railway/maritime/aeronautical communications, and to
- enable 5G network scalability by providing efficient multicast/broadcast resources for data delivery towards the network edges or even user terminal.

SUMMARY

In NTN, low Earth orbiting (LEO) satellites revolve around the earth and each LEO satellite has a different orbit and cycle of revolution. There are two beam types of the LEO satellites-earth-fixed beam and earth-moving beam. The earth-fixed beam serves a certain area on the ground for a time period, and then the beam steers to the next serving area. Thus, its serving area is fixed for the time period. The earth-moving beam dynamically sweeps on the ground. Thus, its the serving area on the ground changes over time.

In NR, it is supposed to provide timing information on when a cell is going to stop serving the area at least in the quasi-earth fixed case. The timing information will be used to assist cell reselection in NTN and decide when to perform measurement on neighbour cells. The timing information can be useful for earth-fixed beam because its cell coverage is fixed for a time period, However, it may be very complex to provide the timing information for the earth-moving beam because its cell coverage changes dynamically so that UEs in a cell may have different service time period. Thus, it may need to evaluate the expected service time period based on the cell coverage-related information and the UE location information.

Therefore, studies for evaluating service time for an NTN cell in a wireless communication system are required.

In an aspect, a method performed by a wireless device in a wireless communication system. The wireless device may receive, from a network, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range. The wireless device may receive, calculate a remaining service trace based on (1) a secant value, among the one or more secant values, corresponding to a vertical distance between the wireless device and the trace of the reference point and (2) a horizontal distance between the wireless device and the reference point. The wireless device may evaluate remaining service time for the NTN cell based on the remaining service trace and a velocity of the reference point. The wireless device may determine whether to perform a mobility to the NTN cell based on the remaining service time.

In another aspect, an apparatus for implementing the above method is provided.

The present disclosure can have various advantageous effects.

According to some embodiments of the present disclosure, a wireless device could efficiently evaluate service time for an NTN cell in a wireless communication system.

For example, a wireless device could select a neighbor cell for cell reselection by evaluating the remaining service time period. In particular, if the time condition exists in a cell (or a frequency), the wireless device could calculate the remaining service time for the cell (or the frequency).

For example, a wireless device can calculate the expected remaining service time based on location information of the wireless device and cell coverage information. Based on the calculated remaining service time, the wireless device can perform measurement or cell reselection to the cell.

For example, a wireless device could evaluate the remaining service time period using only location information. That is, the wireless device could determine a neighbor cell to perform cell reselection only using the location information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
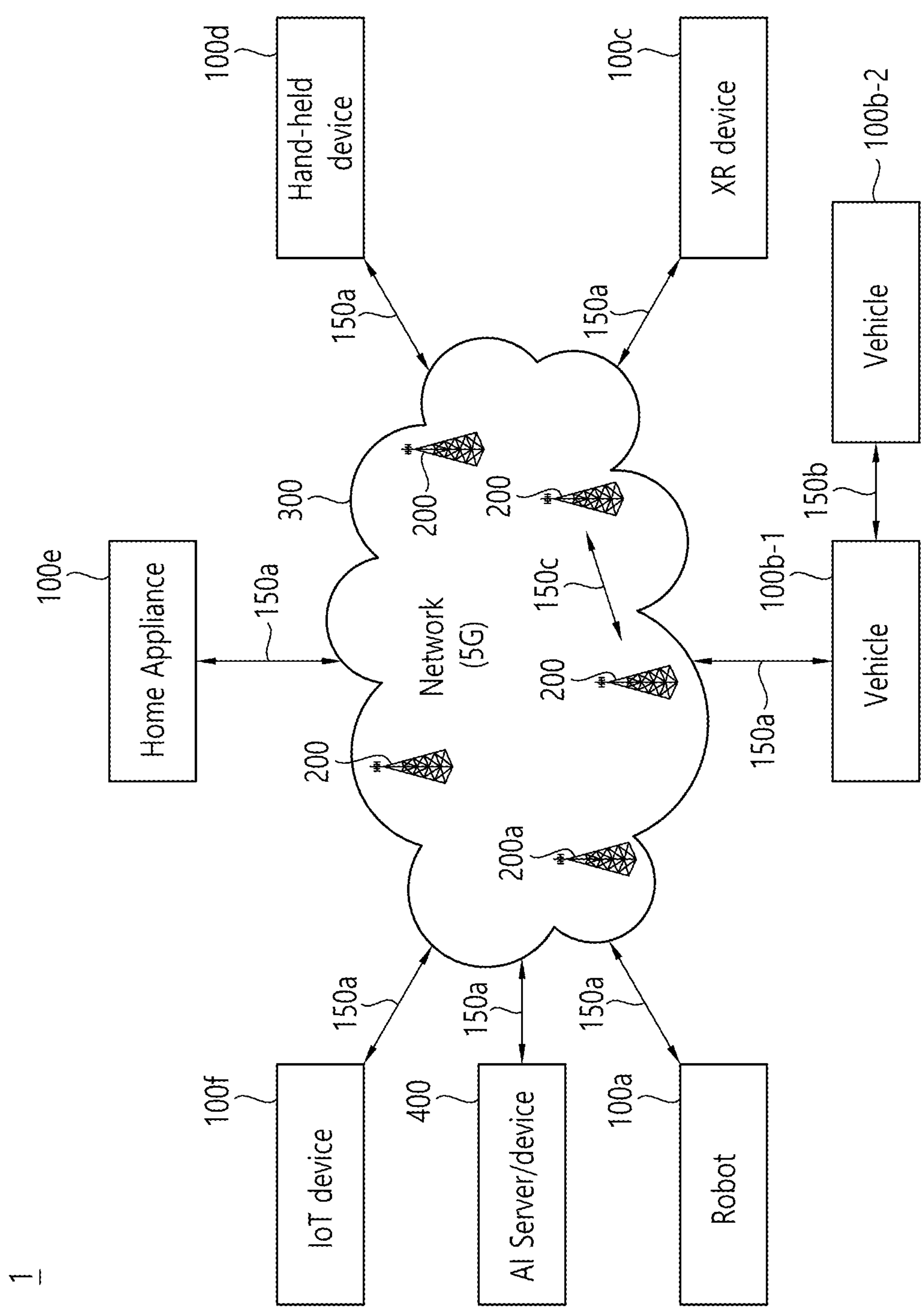
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices

100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each the wireless other through communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
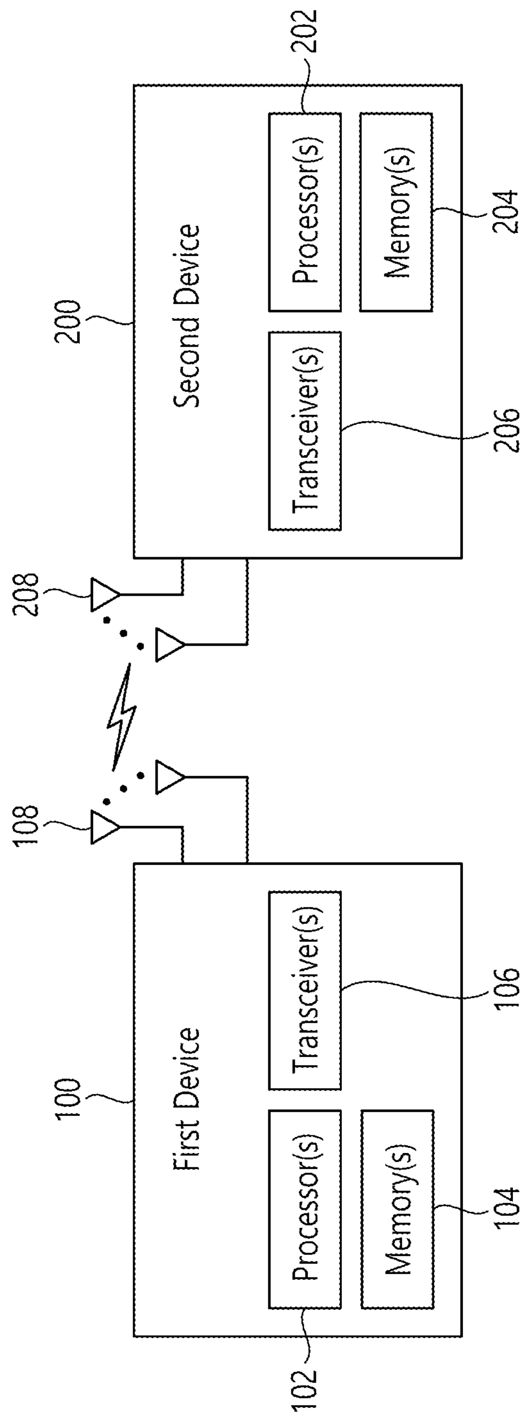
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory (s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory (s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
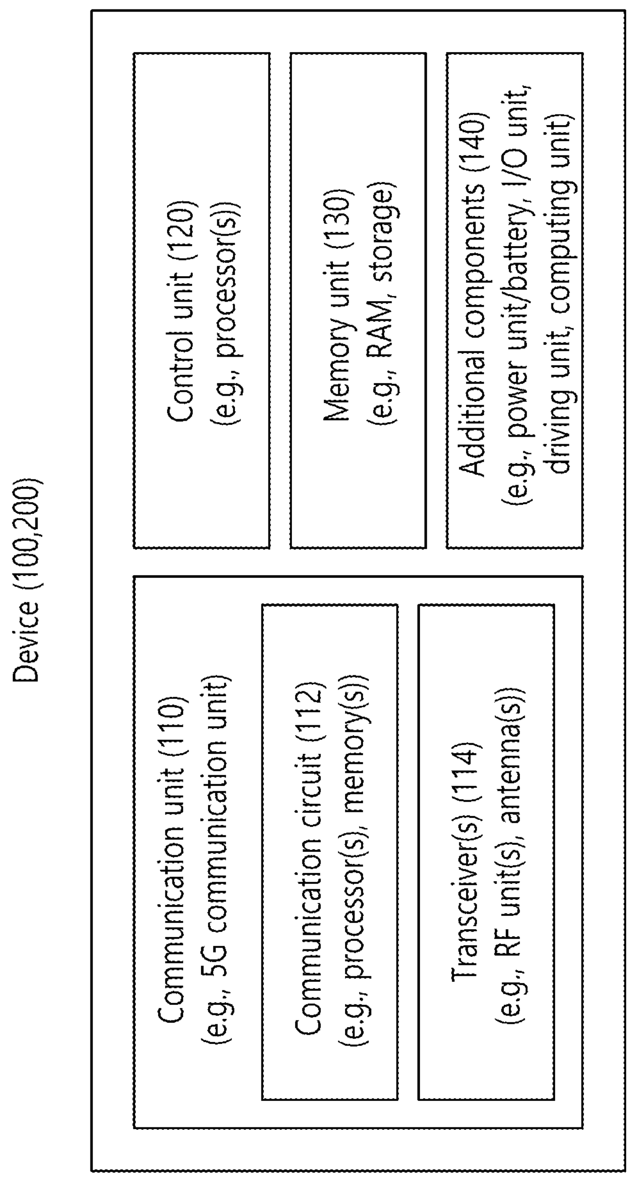
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
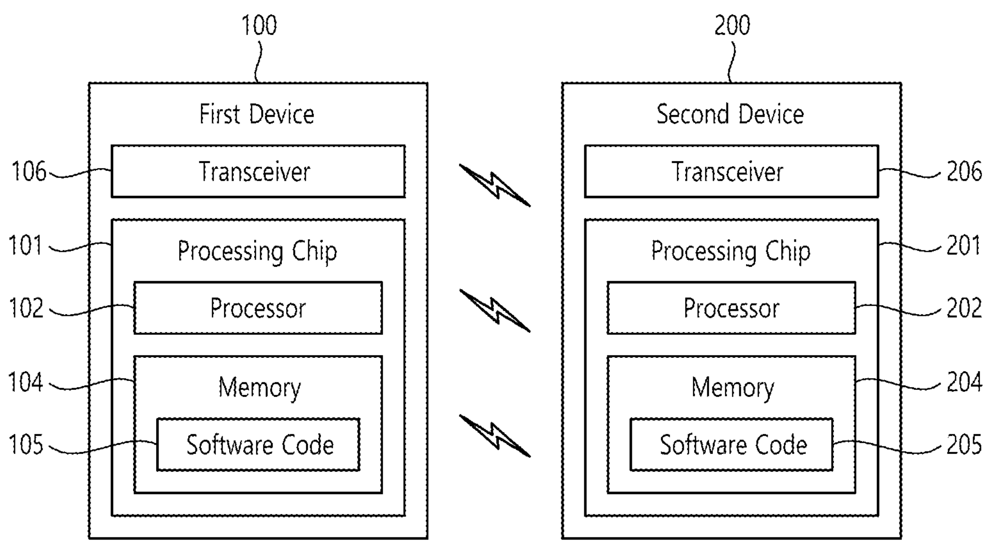
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
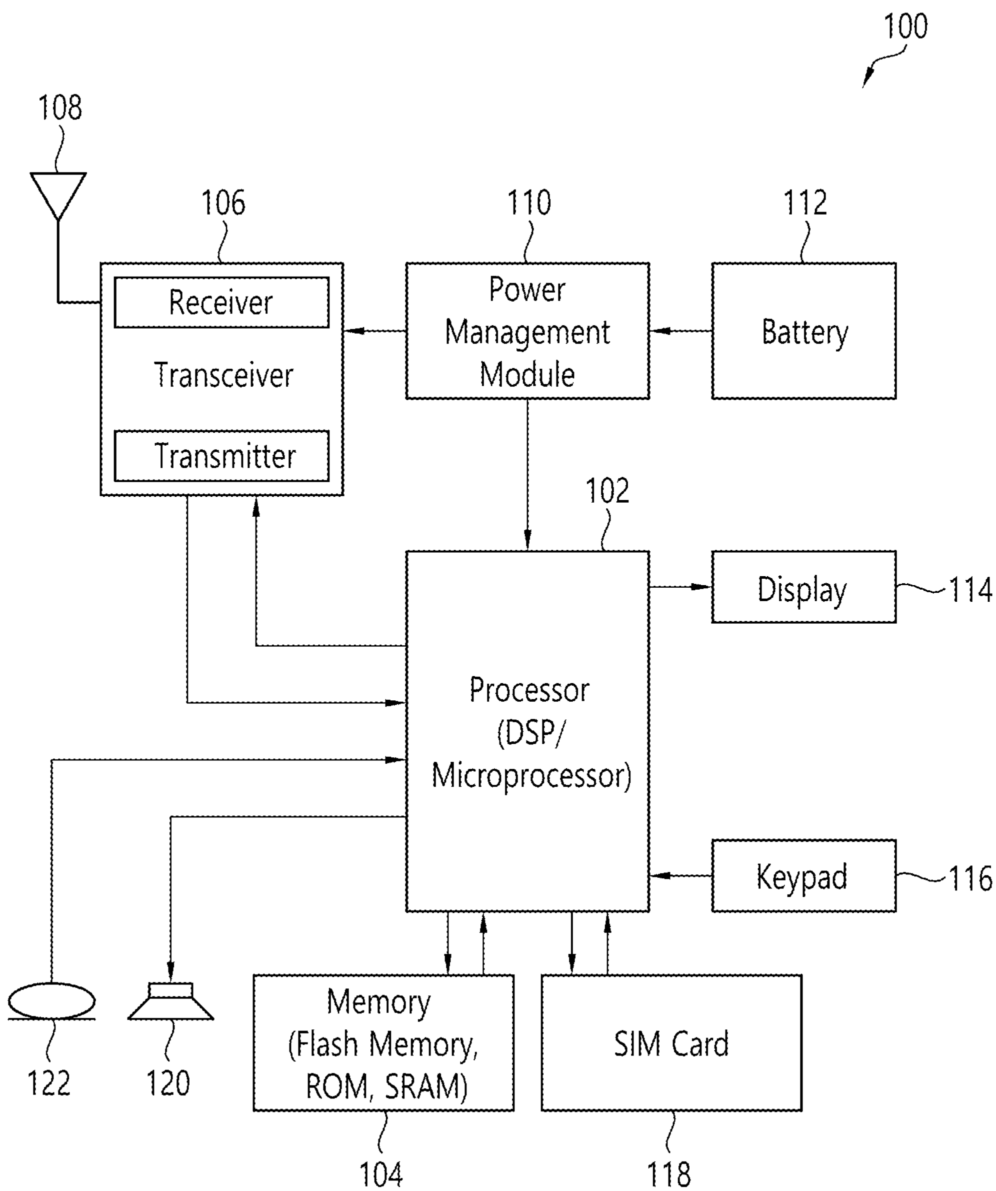
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
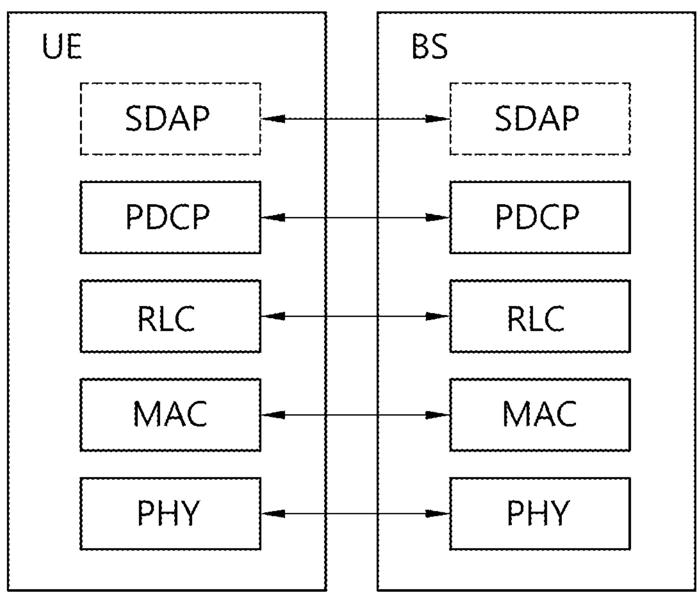
FIGS. 6 and 7 show an example of protocol stacks in a 3GPP based wireless communication system to which implementations of the present disclosure is applied.
Figure 7:
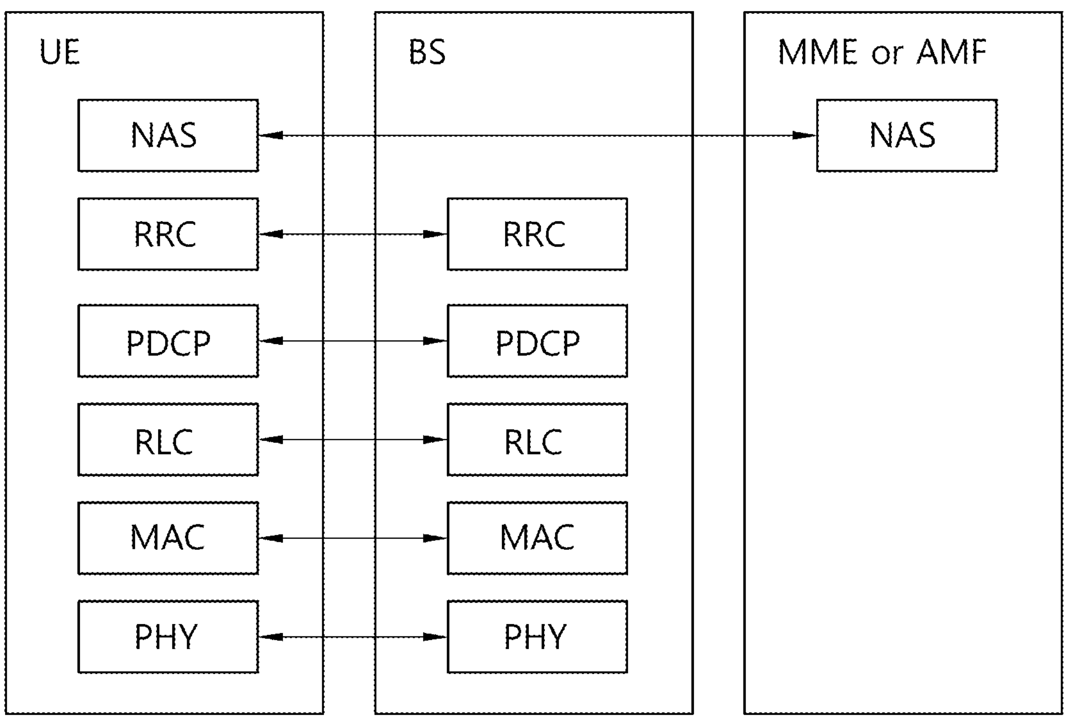

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels: multiplexing/de-multiplexing of MAC SDUs belonging to one or different logical channels into/from transport blocks (TB) delivered to/from the physical layer on transport channels: scheduling information reporting: error correction through hybrid automatic repeat request (HARQ) (one HARQ entity per cell in case of carrier aggregation (CA)): priority handling between UEs by means of dynamic scheduling: priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH): BCCH can be mapped to downlink shared channel (DL-SCH): PCCH can be mapped to paging channel (PCH): CCCH can be mapped to DL-SCH: DCCH can be mapped to DL-SCH; and DTCH can be mapped to DL-SCH. In uplink, the following connections between logical channels and transport channels exist: CCCH can be mapped to uplink shared channel (UL-SCH): DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs: sequence numbering independent of the one in PDCP (UM and AM): error correction through ARQ (AM only): segmentation (AM and UM) and re-segmentation (AM only) of RLC SDUs: reassembly of SDU (AM and UM); duplicate detection (AM only): RLC SDU discard (AM and UM): RLC re-establishment: protocol error detection (AM only).

In the 3GPP NR system, the main services and functions of the PDCP sublayer for the user plane include: sequence numbering: header compression and decompression using robust header compression (ROHC): transfer of user data: reordering and duplicate detection: in-order delivery: PDCP PDU routing (in case of split bearers): retransmission of PDCP SDUs: ciphering, deciphering and integrity protection: PDCP SDU discard: PDCP re-establishment and data recovery for RLC AM: PDCP status reporting for RLC AM: duplication of PDCP PDUs and duplicate discard indication to lower layers. The main services and functions of the PDCP sublayer for the control plane include: sequence numbering: ciphering, deciphering and integrity protection: transfer of control plane data: reordering and duplicate detection: in-order delivery: duplication of PDCP PDUs and duplicate discard indication to lower layers.

In the 3GPP NR system, the main services and functions of SDAP include: mapping between a QoS flow and a data radio bearer: marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS: paging initiated by 5GC or NG-RAN: establishment, maintenance and release of an RRC connection between the UE and NG-RAN: security functions including key management: establishment, configuration, maintenance and release of signaling radio bearers (SRBs) and data radio bearers (DRBs): mobility functions (including: handover and context transfer, UE cell selection and reselection and control of cell selection and reselection, inter-RAT mobility); QoS management functions: UE measurement reporting and control of the reporting: detection of and recovery from radio link failure; NAS message transfer to/from NAS from/to UE.

Figure 8:
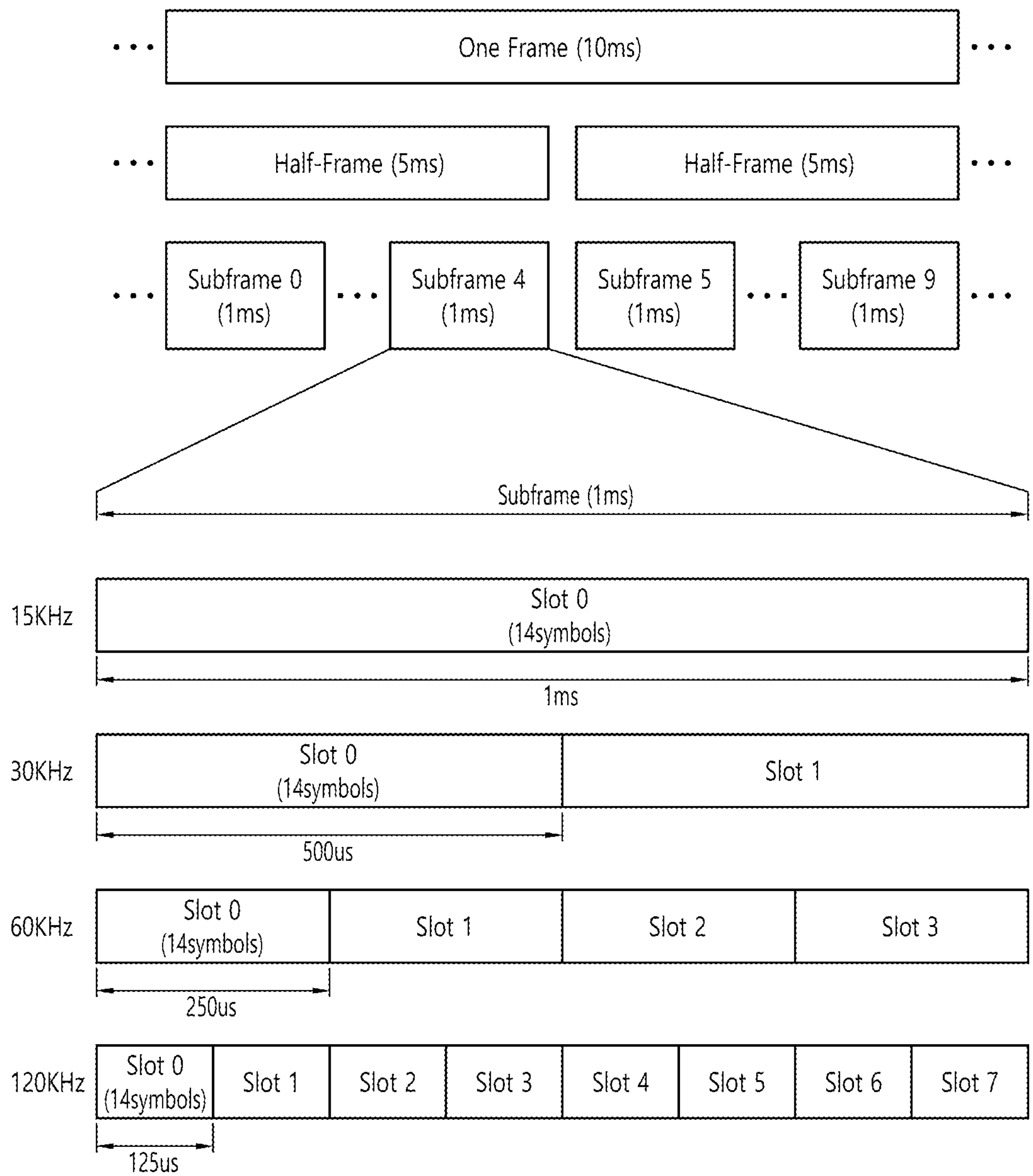
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 KHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHZ (or 5850, 5900, 5925 MHZ, etc.) or more. For example, a frequency band of 6 GHZ (or 5850, 5900, 5925 MHZ, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
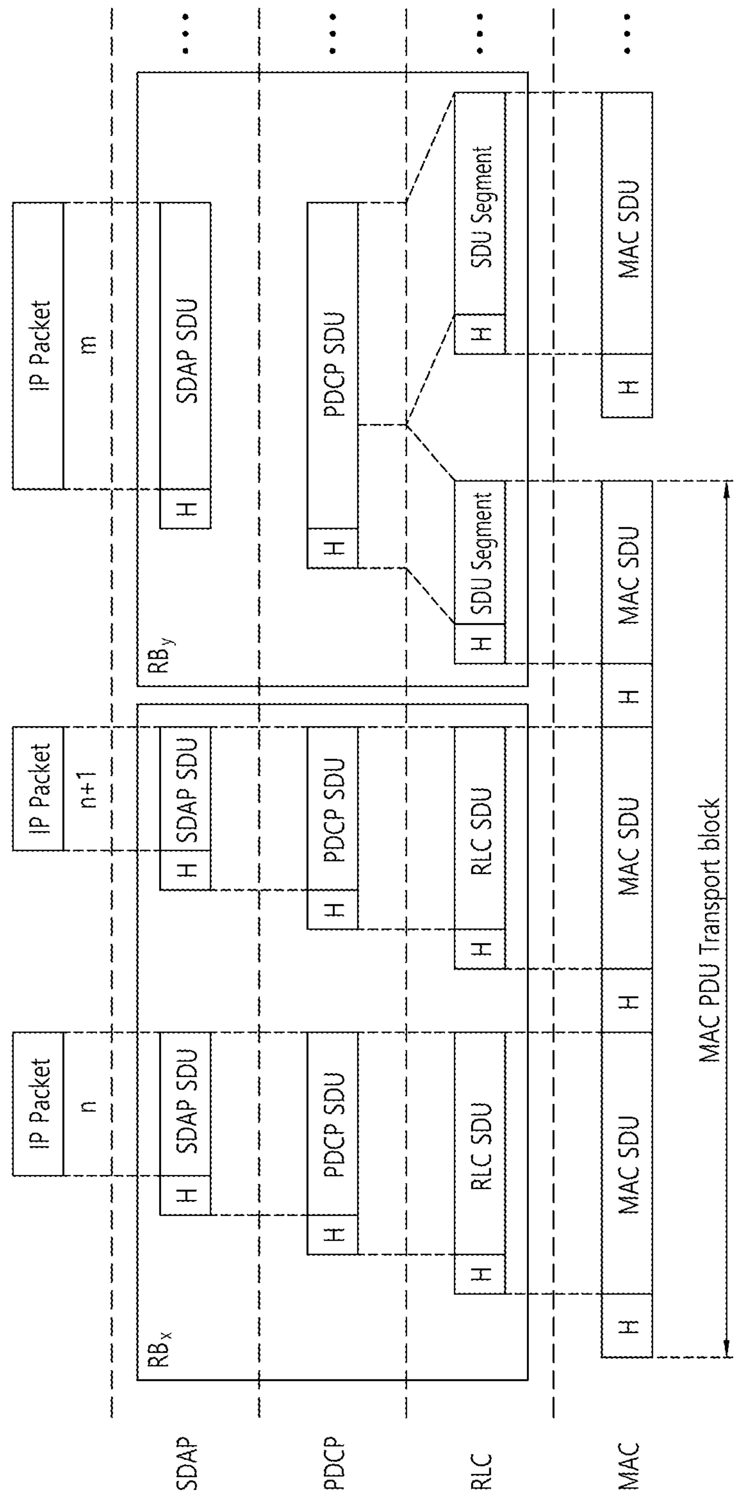
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to cell reselection are described. Section 5.2.4 of 3GPP TS 38.304 v16.4.0 may be referred.

Measurement rules for cell re-selection are described.

Following rules are used by the UE to limit needed measurements:

If the serving cell fulfils $Srxlev>S_{IntraSearchP}$ and $Squal>S_{IntraSearchQ}$, the UE may choose not to perform intra-frequency measurements.

Otherwise, the UE shall perform intra-frequency measurements.

The UE shall apply the following rules for NR inter-frequencies and inter-RAT frequencies which are indicated in system information and for which the UE has priority provided:

For a NR inter-frequency or inter-RAT frequency with a reselection priority higher than the reselection priority of the current NR frequency, the UE shall perform measurements of higher priority NR inter-frequency or inter-RAT frequencies.

For a NR inter-frequency with an equal or lower reselection priority than the reselection priority of the current NR frequency and for inter-RAT frequency with lower reselection priority than the reselection priority of the current NR frequency:

If the serving cell fulfils $Srxlev>S_{nonIntraSearchP}$ and $Squal>S_{nonIntraSearchQ}$, the UE may choose not to perform measurements of NR inter-frequency cells of equal or lower priority, or inter-RAT frequency cells of lower priority:

Otherwise, the UE shall perform measurements of NR inter-frequency cells of equal or lower priority, or inter-RAT frequency cells of lower priority.

If the UE supports relaxed measurement and relaxedMeasurement is present in SIB2, the UE may further relax the needed measurements.

NR Inter-frequency and inter-RAT Cell Reselection criteria are described.

If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN RAT/frequency fulfils $Squal>Thresh_{X, HighQ}$ during a time interval $Treselection_{RAT}$ Otherwise, cell reselection to a cell on a higher priority NR frequency or inter-RAT frequency than the serving frequency shall be performed if:

A cell of a higher priority RAT/frequency fulfils $Srxlev>Thresh_{X, HighP}$ during a time interval $Treselection_{RAT}$; and More than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils $Squal<Thresh_{Serving, LowQ}$ and a cell of a lower priority NR or E-UTRAN RAT/frequency fulfils $Squal>Thresh_{X, LowQ}$ during a time interval $Treselection_{RAT}$.

Otherwise, cell reselection to a cell on a lower priority NR frequency or inter-RAT frequency than the serving frequency shall be performed if:

The serving cell fulfils $Srxlev<Thresh_{Serving, LowP}$ and a cell of a lower priority RAT/frequency fulfils $Srxlev>Thresh_{X, LowP}$ during a time interval $Treselection_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, the highest ranked cell among the cells on the highest priority frequency(ies) meeting the criteria;

If the highest-priority frequency is from another RAT, the strongest cell among the cells on the highest priority frequency(ies) meeting the criteria of that RAT.

Intra-frequency and equal priority inter-frequency Cell Reselection criteria

The cell-ranking criterion $R_s$ for serving cell and $R_n$ for neighbouring cells is defined by:

$$R_s = Q_{meas,s} + Q_{hyst} - Qoffset_{temp}$$

$$R_n = Q_{meas,n} - Q_{offset} - Qoffset_{temp}$$

Table 5 shows the detailed description of the parameters used for the cell-ranking criterion.

TABLE 5

| | |
|---|---|
| $Q_{meas}$ | RSRP measurement quantity used in cell reselections. |
| Qoffset | For intra-frequency: Equals to $Qoffset_{s, n}$, if $Qoffset_{s, n}$ is valid, otherwise this equals to zero.<br>For inter-frequency: Equals to $Qoffset_{s, n}$ plus $Qoffset_{frequency}$, if $Qoffset_{s, n}$ is valid, otherwise this equals to $Qoffset_{frequency}$. |
| $Qoffset_{temp}$ | Offset temporarily applied to a cell. |

The UE shall perform ranking of all cells that fulfil the cell selection criterion S.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them.

In all cases, the UE shall reselect the new cell, only if the following conditions are met:

the new cell is better than the serving cell according to the cell reselection criteria specified above during a time interval $Treselection_{RAT}$;

more than 1 second has elapsed since the UE camped on the current serving cell.

If rangeToBestCell is configured but absThreshSS-BlocksConsolidation is not configured on an NR frequency, the UE considers that there is one beam above the threshold for each cell on that frequency.

Hereinafter, technical features related to Non-terrestrial networks are described. Sections 3, 4, and Annex A of 3GPP TS 38.821 v16.0.0 may be referred.

Terms related to the NTN are described.

Availability: % of time during which the RAN is available for the targeted communication. Unavailable communication for shorter period than [Y] ms shall not be counted. The RAN may contain several access network components among which an NTN to achieve multi-connectivity or link aggregation.

Feeder link: Wireless link between NTN Gateway and satellite

Geostationary Earth orbit: Circular orbit at 35,786 km above the Earth's equator and following the direction of the Earth's rotation. An object in such an orbit has an orbital period equal to the Earth's rotational period and thus appears motionless, at a fixed position in the sky, to ground observers.

Low Earth Orbit: Orbit around the Earth with an altitude between 300 km, and 1500 km.

Medium Earth Orbit: region of space around the Earth above low Earth orbit and below geostationary Earth Orbit.

Minimum Elevation angle: minimum angle under which the satellite or UAS platform can be seen by a terminal.

Mobile Services: a radio-communication service between mobile and land stations, or between mobile stations Mobile Satellite Services: A radio-communication service between mobile earth stations and one or more space stations, or between space stations used by this service; or between mobile earth stations by means of one or more space stations Non-Geostationary Satellites: Satellites (LEO and MEO) orbiting around the Earth with a period that varies approximately between 1.5 hour and 10 hours. It is necessary to have a constellation of several Non-Geostationary satellites associated with handover mechanisms to ensure a service continuity.

Non-terrestrial networks: Networks, or segments of networks, using an airborne or space-borne vehicle to embark a transmission equipment relay node or base station.

NTN-gateway: an earth station or gateway is located at the surface of Earth, and providing sufficient RF power and RF sensitivity for accessing to the satellite (resp. HAPS). NTN Gateway is a transport network layer (TNL) node.

On Board processing: digital processing carried out on uplink RF signals aboard a satellite or an aerial.

On board NTN gNB: gNB implemented in the regenerative payload on board a satellite (respectively HAPS).

On ground NTN gNB: gNB of a transparent satellite (respectively HAPS) payload implemented on ground.

One-way latency: time required to propagate through a telecommunication system from a terminal to the public data network or from the public data network to the terminal. This is especially used for voice and video conference applications.

Regenerative payload: payload that transforms and amplifies an uplink RF signal before transmitting it on the downlink. The transformation of the signal refers to digital processing that may include demodulation, decoding, re-encoding, re-modulation and/or filtering.

Round Trip Delay: time required for a signal to travel from a terminal to the sat-gateway or from the sat-gateway to the terminal and back. This is especially used for web-based applications.

Satellite: a space-borne vehicle embarking a bent pipe payload or a regenerative payload telecommunication transmitter, placed into Low-Earth Orbit (LEO), Medium-Earth Orbit (MEO), or Geostationary Earth Orbit (GEO).

Satellite beam: A beam generated by an antenna on-board a satellite

Service link: Radio link between satellite and UE

Transparent payload: payload that changes the frequency carrier of the uplink RF signal, filters and amplifies it before transmitting it on the downlink Unmanned Aircraft Systems: Systems encompassing Tethered UAS (TUA), Lighter Than Air UAS (LTA), Heavier Than Air UAS (HTA), all operating in altitudes typically between 8 and 50 km including High Altitude Platforms (HAPs)

User Connectivity: capability to establish and maintain data/voice/video transfer between networks and Terminals User Throughput: data rate provided to a terminal Non-Terrestrial Networks Overview A non-terrestrial network refers to a network, or segment of networks using RF resources on board a satellite (or UAS platform).

Figure 10:
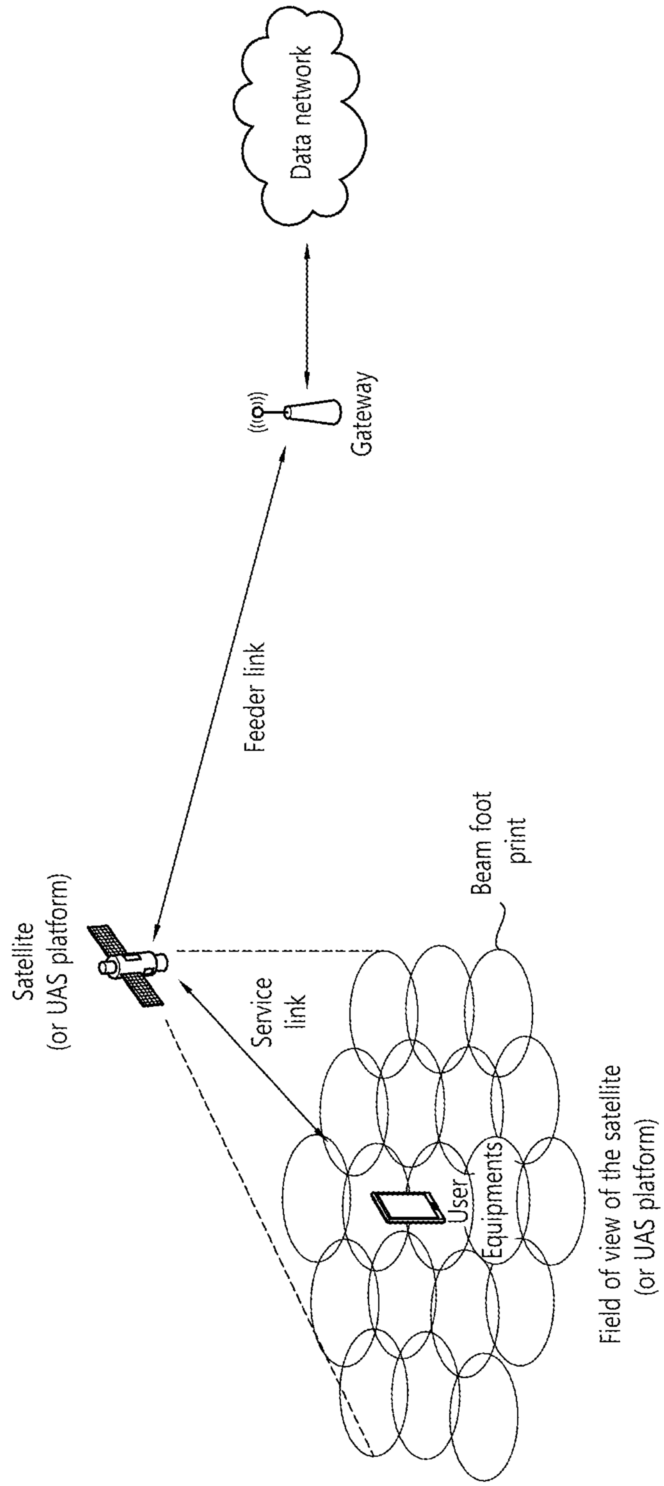
FIG. 10 shows Non-terrestrial network typical scenario based on transparent payload to which implementations of the present disclosure is applied.
Figure 11:
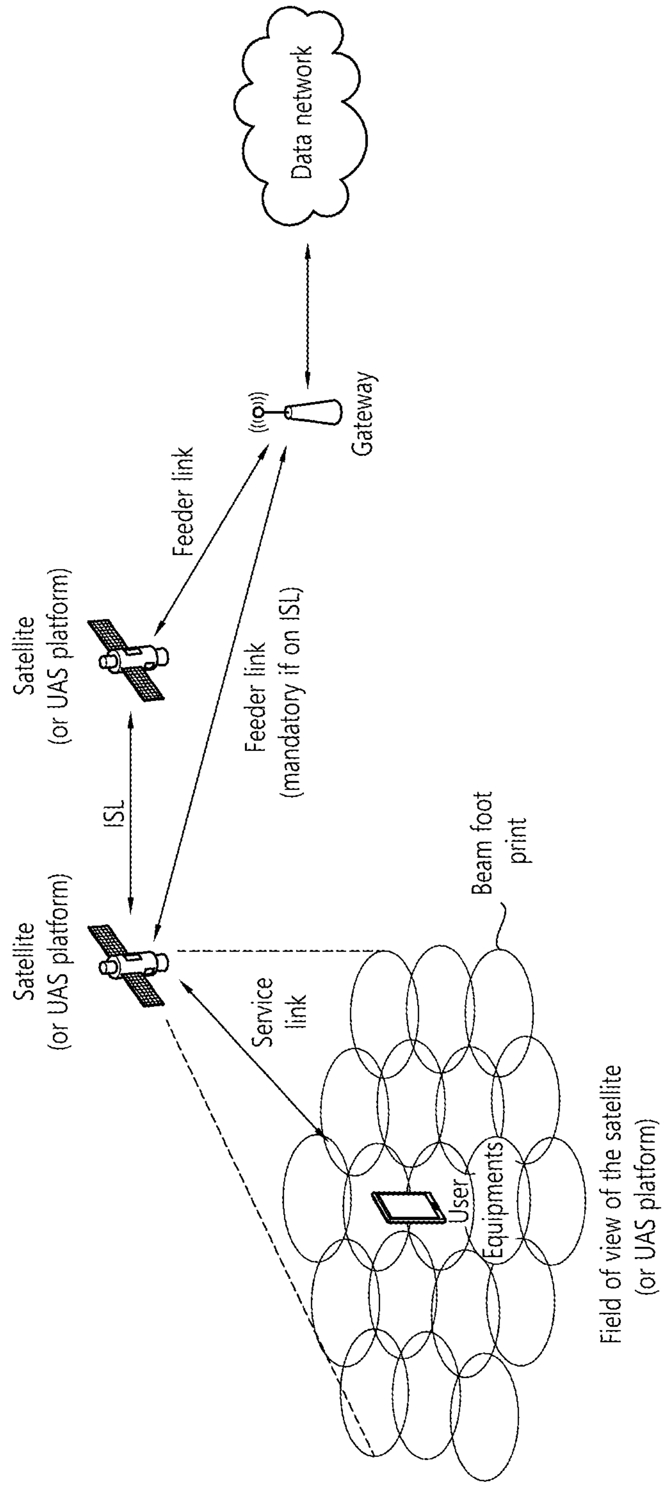
FIG. 11 shows Non-terrestrial network typical scenario based on regenerative payload to which implementations of the present disclosure is applied.

The typical scenario of a non-terrestrial network providing access to user equipment is depicted in FIGS. 10 and 11 shows.

FIG. 10 shows Non-terrestrial network typical scenario based on transparent payload to which implementations of the present disclosure is applied.

FIG. 11 shows Non-terrestrial network typical scenario based on regenerative payload to which implementations of the present disclosure is applied.

Non-Terrestrial Network typically features the following elements:

- One or several sat-gateways that connect the Non-Terrestrial Network to a public data network
- a GEO satellite is fed by one or several sat-gateways which are deployed across the satellite targeted coverage (e.g. regional or even continental coverage). We assume that UE in a cell are served by only one sat-gateway
- A Non-GEO satellite served successively by one or several sat-gateways at a time. The system ensures service and feeder link continuity between the successive serving sat-gateways with sufficient time duration to proceed with mobility anchoring and hand-over
- A Feeder link or radio link between a sat-gateway and the satellite (or UAS platform)
- A service link or radio link between the user equipment and the satellite (or UAS platform).
- A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.
- A transparent payload: Radio Frequency filtering, Frequency conversion and amplification. Hence, the waveform signal repeated by the payload is un-changed;
- A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment are served by the satellite (or UAS platform) within the targeted service area.

There may be different types of satellites (or UAS platforms). Table 6 shows types of NTN platforms.

TABLE 6

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Typically,

GEO satellite and UAS are used to provide continental, regional or local service.

a constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

Non-Terrestrial Networks Reference Scenarios

Non-terrestrial networks provides access to user equipment in six reference scenarios including Circular orbiting and notional station keeping platforms.

Highest RTD constraint

Highest Doppler constraint

A transparent and a regenerative payload

One ISL case and one without ISL. Regenerative payload is mandatory in the case of inter-satellite links.

Fixed or steerable beams resulting respectively in moving or fixed beam foot print on the ground Six scenarios are considered as depicted in table 7 and are detailed in tables 8 and 9.

Table 7 shows reference scenarios.

TABLE 7

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

Tables 8 and 9 shows reference scenario parameters.

TABLE 8

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth capability (service link) | 30 MHz for band < 6 GHz<br>1 GHz for band > 6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No (the beams move with the satellite)<br>Scenario D 1: Yes (steerable beams), see note 1<br>Scenario D 2: No (the beams move with the satellite) |

TABLE 8-continued

| Scenarios | GEO based non-terrestrial access network (Scenario A and B) | LEO based non-terrestrial access network (Scenario C & D) |
|---|---|---|
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |

TABLE 9

| | | |
|---|---|---|
| Max Round Trip Delay (propagation delay only) | Scenario A: 541.46 ms (service and feeder links)<br>Scenario B: 270.73 ms (service link only) | Scenario C: (transparent payload: service and feeder links)<br>25.77 ms (600 km)<br>41.77 ms (1200 km)<br>Scenario D: (regenerative payload: service link only)<br>12.89 ms (600 km)<br>20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km)<br>21 ppm(1200 km) |
| Max Doppler shift variation (earth fixed user equipment) | 0.000 045 ppm/s | 0.27 ppm/s (600 km)<br>0.13 ppm/s(1200 km) |
| User equipment motion on the earth | 1200 km/h (e.g. aircraft) | 500 km/h (e.g. high speed train)<br>Possibly 1200 km/h (e.g. aircraft) |
| User equipment antenna types | Omnidirectional antenna (linear polarisation), assuming 0 dBi<br>Directive antenna (up to 60 cm equivalent aperture diameter in circular polarisation) | |
| User equipment Tx power | Omnidirectional antenna: UE power class 3 with up to 200 mW<br>Directive antenna: up to 20 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP definied Radio interface |

NOTE 1:
Each satellite has the capability to steer beams towards fixed points on earth using beamforming techniques. This is applicable for a period of time corresponding to the visibility time of the satellite
NOTE 2:
Max delay variation within a beam (earth fixed user equipment) is calculated based on Min Elevation angle for both gateway and user equipment
NOTE 3:
Max differential delay within a beam is calculated based on Max beam foot print diameter at nadir
NOTE 4:
Speed of light used for delay calculation is 299792458 m/s.
NOTE 5:
The Maximum beam foot print size for GEO is based on current state of the art GEO High Throughput systems, assuming either spot beams at the edge of coverage (low elevation).
NOTE 6:
The maximum differential delay at cell level has been computed considering the one at beam level for largest beam size. It does not preclude that cell may include more than one beam when beam size are small or medium size. However the cumulated differential delay of all beams within a cell will not exceed the maximum differential delay at cell level in the table above.

The NTN study results apply to GEO scenarios as well as all NGSO scenarios with circular orbit at altitude greater than or equal to 600 km.

Technical features related to satellite ephemeris are described.

Key Parameters

Key parameters of orbital mechanics of all commercial satellites are publicly available from multiple sources. This information is called ephemeris, which is used by astronomers to describe the location and orbital behaviour of stars and any other astronomic bodies.

Typically, ephemeris is expressed in an ASCII file using Two-Line Element (TLE) format. The TLE data format encodes a list of orbital elements of an Earth-orbiting object in two 70-column lines. The contents of the TLE table are reproduced below.

Table 10 shows first line of the ephemeris.

TABLE 10

| Field | Columns | Content |
|---|---|---|
| 1 | 01-01 | Line number (1) |
| 2 | 03-07 | Satellite number |
| 3 | 08-08 | Classification (U = Unclassified) |
| 4 | 10-11 | International Designator (Last two digits of |

TABLE 10-continued

| Field | Columns | Content |
|---|---|---|
| | | launch year) |
| 5 | 12-14 | International Designator (Launch number of the year) |
| 6 | 15-17 | International Designator (piece of the launch) |
| 7 | 19-20 | Epoch Year (last two digits of year) |
| 8 | 21-32 | Epoch (day of the year and fractional portion of the day) |
| 9 | 34-43 | First Time Derivative of the Mean Motion divided by two |
| 10 | 45-52 | Second Time Derivative of Mean Motion divided by six (decimal point assumed) |
| 11 | 54-61 | BSTAR drag term (decimal point assumed) |
| 12 | 63-63 | The number 0 (originally this should have been “Ephemeris type”) |
| 13 | 65-68 | Element set number. Incremented when a new TLE is generated for this object. |
| 14 | 69-69 | Checksum (modulo 10) |

Table 11 shows second line of the ephemeris.

TABLE 11

| Field | Columns | Content |
|---|---|---|
| 1 | 01-01 | Line number (2) |
| 2 | 03-07 | Satellite number |
| 3 | 09-16 | Inclination (degrees) |
| 4 | 18-25 | Right ascension of the ascending node (degrees) |
| 5 | 27-33 | Eccentricity (decimal point assumed) |
| 6 | 35-42 | Argument of perigee (degrees) |
| 7 | 44-51 | Mean Anomaly (degrees) |
| 8 | 53-63 | Mean Motion (revolutions per day) |
| 9 | 64-68 | Revolution number at epoch (revolutions) |
| 10 | 69-69 | Checksum (modulo 10) |

The TLE format is an expression of mean orbital parameters “True Equator, Mean Equinox”, filtering out short term perturbations.

From its TLE format data, the SGP4 (Simplified General Propagation) model is used to calculate the location of the space object revolving about the earth in True Equator Mean Equinox (TEME) coordinate. Then it can be converted into the Earth-Centered, Earth-Fixed (ECEF) Cartesian x, y, z coordinate as a function of time.

The instantaneous velocity at that time can also be obtained. In ECEF coordinate, z-axis points to the true North, while x axis and y axis intersects 0-degrees latitude and longitude respectively.

Figure 12:
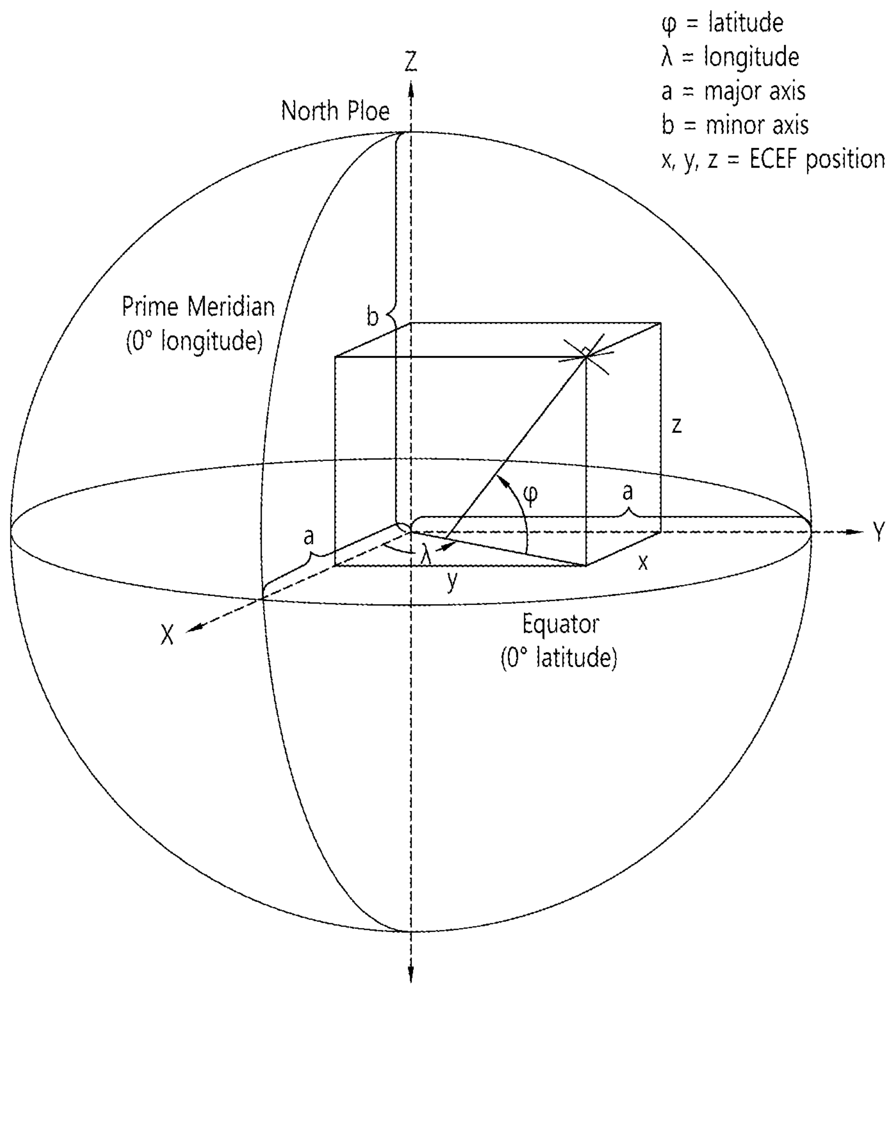
FIG. 12 shows Earth-Centered, Earth-Fixed (ECEF) coordinates in relation to latitude and longitude to which implementations of the present disclosure is applied.

FIG. 12 shows Earth-Centered, Earth-Fixed (ECEF) coordinates in relation to latitude and longitude to which implementations of the present disclosure is applied.

Table 12 shows an example of ephemeris converted into ECEF format for the Telestar-19 satellite.

TABLE 12

| Epoch (day · hr · min · sec) | X[km] | Y[km] | Z[km] | dX dt[km/s] | dY dt[km/s] | dZ/dt [km/s] |
|---|---|---|---|---|---|---|
| 2018 Oct. 26 02:00:00.000 | 19151.529 | −37578.251 | 17.682 | −0.00151 | −0.00102 | −0.00106 |
| 2018 Oct. 26 02:05:00.000 | 19151.073 | −37578.556 | 17.359 | −0.00152 | −0.00101 | −0.00109 |
| 2018 Oct. 26 02:10:00.000 | 19150.614 | −37578.855 | 17.029 | −0.00154 | −0.00099 | −0.00112 |
| 2018 Oct. 26 02:15:00.000 | 19150.150 | −37579.151 | 16.690 | −0.00155 | −0.00098 | −0.00114 |

Given a specific point in time, it is straightforward to calculate the satellite location by interpolation. The example given above refers to a geosynchronous (GEO) satellite, in which the epoch interval is 5 minutes. For LEO satellites, the intervals may be much shorter, on the order of seconds.

In NR, Idle/Inactive modes are supported.

Timing info assisted cell reselection is proposed.

For example, at least in the quasi-earth fixed case, the timing information on when a cell is going to stop serving the area is needed to assist cell reselection in NTN for earth fixed scenario.

For example, at least in the quasi-earth fixed case, the timing information on when a cell is going to stop serving the area is used to decide when to perform measurement on neighbor cells.

For example, at least in the quasi-earth fixed case, the timing information on when a cell is going to stop serving the area for earth fixed scenario is broadcast to UE via system information.

Ephemeris/Location assisted cell reselection is proposed.

For example, location assisted cell reselection could be introduced in NTN.

For example, in location assisted cell reselection in NTN, the distance between the UE and the reference location of the cell (serving cell and/or neighbor cell) could be considered.

Meanwhile, in NTN, low Earth orbiting (LEO) satellites revolve around the earth and each LEO satellite has a different orbit and cycle of revolution. There are two beam types of the LEO satellites—earth-fixed beam and earth-moving beam. The earth-fixed beam serves a certain area on the ground for a time period, and then the beam steers to the next serving area. Thus, its serving area is fixed for the time period. The earth-moving beam dynamically sweeps on the ground. Thus, its the serving area on the ground changes over time.

In NR, it is supposed to provide timing information on when a cell is going to stop serving the area at least in the quasi-earth fixed case. The timing information will be used to assist cell reselection in NTN and decide when to perform measurement on neighbour cells. The timing information can be useful for earth-fixed beam because its cell coverage is fixed for a time period, However, it may be very complex to provide the timing information for the earth-moving beam because its cell coverage changes dynamically so that UEs in a cell may have different service time period. Thus, it may need to evaluate the expected service time period based on the cell coverage-related information and the UE location information.

Therefore, studies for evaluating service time for an NTN cell in a wireless communication system are required.

Hereinafter, a method for evaluating service time for an NTN cell in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
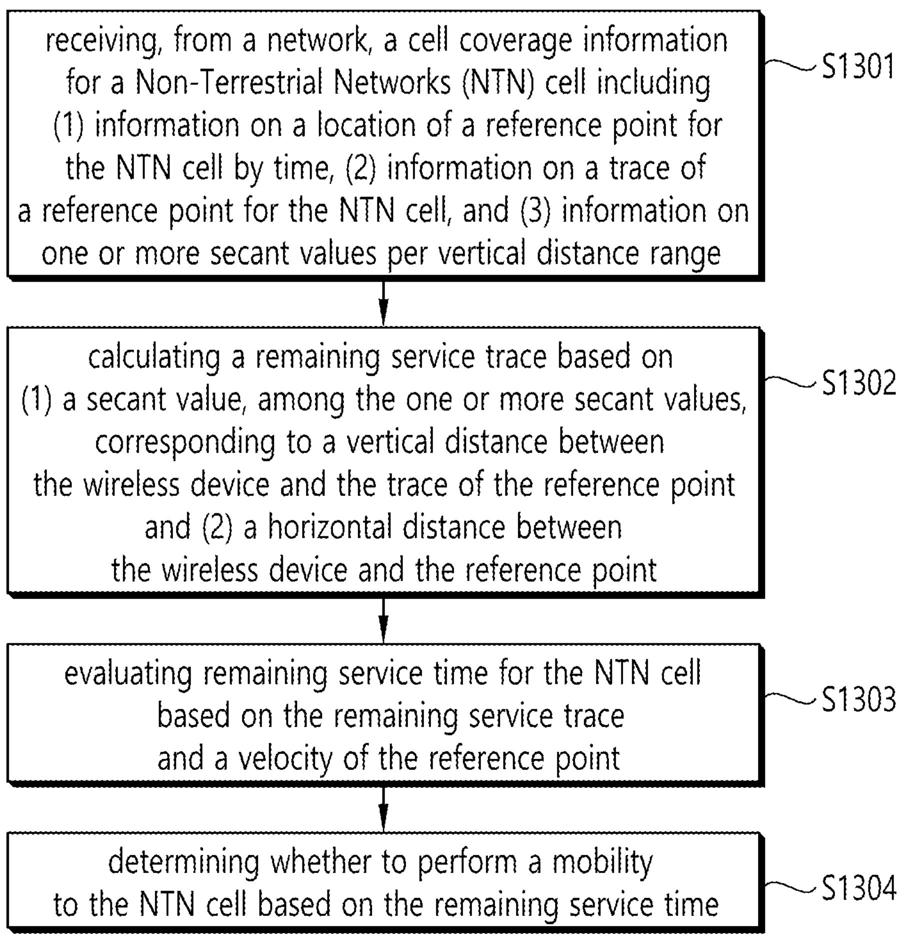
FIG. 13 shows an example of a method for evaluating service time for an NTN cell in a wireless communication system, according to some embodiments of the present disclosure.

FIG. 13 shows an example of a method for evaluating service time for an NTN cell in a wireless communication system, according to some embodiments of the present disclosure.

In particular, FIG. 13 shows an example of a method performed by a wireless device.

In step S1301, a wireless device may receive, from a network, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range.

For example, the cell coverage information may include information on a distance threshold.

The wireless device may determine whether a distance between the wireless device and the reference point is lower than or equal to the distance threshold.

If the distance between the wireless device and the reference point is lower than or equal to the distance threshold, the wireless device may perform the following steps (that is, steps S1302, S1303, and S1304). That is, the step of calculating the remaining service and the step of evaluating the remaining service time may be initiated based on determining that the distance between the wireless device and the reference point is lower than or equal to the distance threshold.

Otherwise, if the distance between the wireless device and the reference point is greater than the distance threshold, the wireless device may not perform the following steps (that is, steps S1302, S1303, and S1304). That is, the step of calculating the remaining service and the step of evaluating the remaining service time may not be initiated based on determining that the distance between the wireless device and the reference point is greater than the distance threshold.

Accordingly, the wireless device could perform the calculation of the remaining service time only when the wireless device is located near the NTN cell.

According to some embodiments of the present disclosure, the cell coverage information may include cell reference point information. The reference point information may include (i) location information of the cell reference point by time or (ii) coordination information of the cell reference point by time.

For example, the cell coverage information may include information on the velocity of the reference point. That is, the reference point information may include velocity of the reference point by time. The velocity may include the moving direction of the reference point.

The reference point information may include cell reference point trace. The cell reference point trace may be the straight line that represents the moving direction of the cell reference point. The cell reference point trace may be consist of two or more coordination and the straight line between the two coordination may be the cell reference point trace.

The cell coverage information may include reference distance. If the distance between the wireless device and the cell reference point is lower than the reference distance, the wireless device may perform measurement on the cell and the wireless device may perform cell reselection to the cell.

The cell coverage information may include information on secant values (or half of the secant values). Each half of the secant value may be mapped to each vertical distance range.

For example, the secant value may be length of a secant line within the cell coverage. The secant line may be parallel to the trace of the reference point and may pass the location of the wireless device. The length between the secant line and the cell reference point trace line may be the vertical distance between the wireless device and the trace of the reference point.

In step S1302, a wireless device may calculate a remaining service trace based on (1) a secant value, among the one or more secant values, corresponding to a vertical distance between the wireless device and the trace of the reference point and (2) a horizontal distance between the wireless device and the reference point.

For example, the wireless device may calculate a distance between the reference point and the location of the wireless device. The wireless device may calculate the vertical distance based on the cell coverage information. The vertical distance may be the closest distance or perpendicular distance between the trace of the reference point and the wireless device. In other words, the vertical distance may be the length of the perpendicular line from the location of the wireless device to the trace of the reference point.

For example, the horizontal distance between the wireless device and the reference point may be calculated from (1) a distance between the wireless device and the reference point and (2) the vertical distance between the wireless device and the trace of the reference point.

That is, the wireless device may calculate the horizontal distance from the distance between the reference point and the wireless device and the vertical distance. The horizontal distance may be the distance between the reference point and closest point from the location of the wireless device to the trace of the reference point.

For example, the remaining service trace may be calculated by adding the horizontal distance to half of the secant value corresponding to the vertical distance, based on that the reference point is getting closer to the wireless device.

For example, the remaining service trace may be calculated by subtracting the horizontal distance from half of the secant value corresponding to the vertical distance, based on that the reference point is getting further from the wireless device.

In step S1303, a wireless device may evaluate remaining service time for the NTN cell based on the remaining service trace and a velocity of the reference point.

For example, the remaining service time may be calculated by dividing the remaining service trace by the velocity of the reference point.

In step S1304, a wireless device may determine whether to perform a mobility to the NTN cell based on the remaining service time.

For example, the mobility to the NTN cell may include a cell reselection to the NTN cell.

For example, the wireless device may perform measurement on the NTN cell based on the remaining service time.

That is, a wireless device may compare the remaining service time of the NTN cell with other NTN cells. The wireless device may perform the cell reselection based on that the remaining service time of the NTN cell is the longest.

According to some embodiments of the present disclosure, a wireless device may receive, from a network, cell coverage information for multiple NTN cells. For example, the wireless device may receive first cell coverage information for the first NTN cell and second cell coverage information for the second NTN cell. For example, a single message may include first cell coverage information and a second cell coverage information.

The wireless device may calculate a first remaining service trace based on the first cell coverage information, as step S1302. The wireless device may evaluate first remaining service time based on the first remaining service trace, as step S1303.

Similarly, the wireless device may calculate a second remaining service trace based on the second cell coverage information, as step S1302. The wireless device may evaluate second remaining service time based on the second remaining service trace, as step S1303.

After evaluating both the first remaining service time and the second remaining service time, the wireless device may compare the first remaining service time and the second remaining service time.

The wireless device may determine one NTN cell among the first NTN cell and the second NTN cell for a mobility.

For example, when the first remaining service time is greater than or equal to the second remaining service time, the wireless device may perform the cell reselection on the first NTN cell.

In this case, the wireless device may perform measurement on the second NTN cell, while camping on the first NTN cell. Otherwise, the wireless device may not perform the measurement on the second cell.

For example, when the first remaining service time is less than or equal to the second remaining service time, the wireless device may perform the cell reselection on the second NTN cell.

In this case, the wireless device may perform measurement on the first NTN cell, while camping on the second NTN cell. Otherwise, the wireless device may not perform the measurement on the first cell.

According to some embodiments of the present disclosure, the wireless device may be in communication with at least one of a user equipment, a network, or an autonomous vehicle other than the wireless device.

Figure 14:
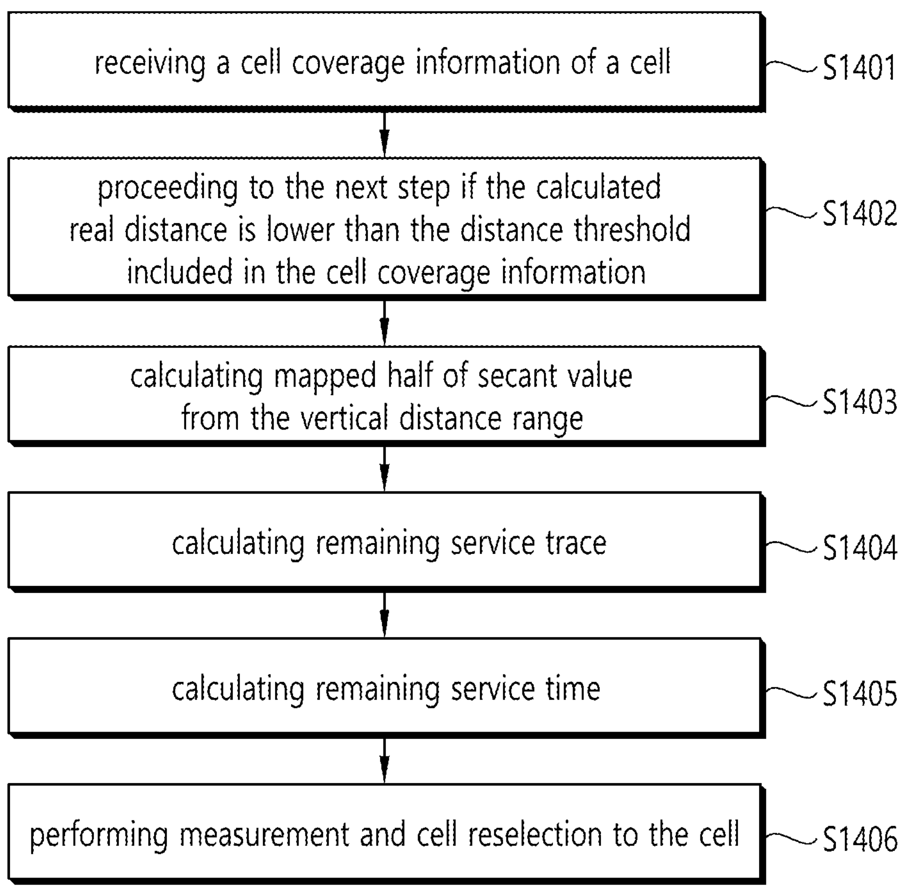
FIG. 14 shows an example of UE operations for evaluating service time for an NTN cell in a wireless communication system, according to some embodiments of the present disclosure.

FIG. 14 shows an example of UE operations for evaluating service time for an NTN cell in a wireless communication system, according to some embodiments of the present disclosure.

In the present disclosure, the UE may be provided with cell coverage-related information. Based on the information and the UE location information, UE may estimate the expected service time period for the UE. The service time period may be used for the cell reselection/measurement by the UE.

Referring to FIG. 14, in step S1401, A UE may receive cell coverage information of a cell.

Figure 16:
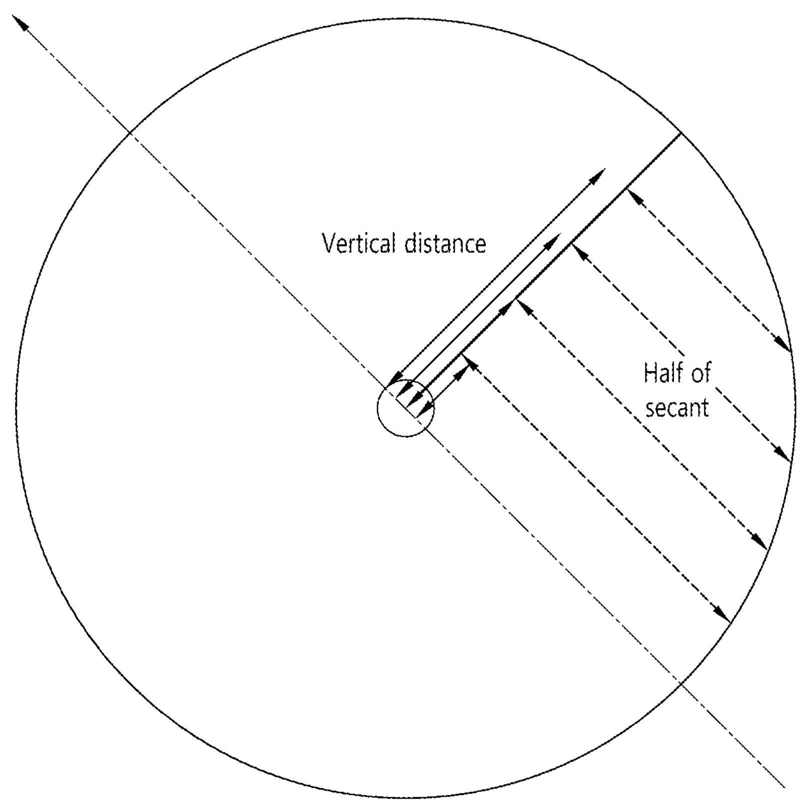
FIG. 16 shows examples of half of secant values mapped to each vertical distance range.
Figure 18:
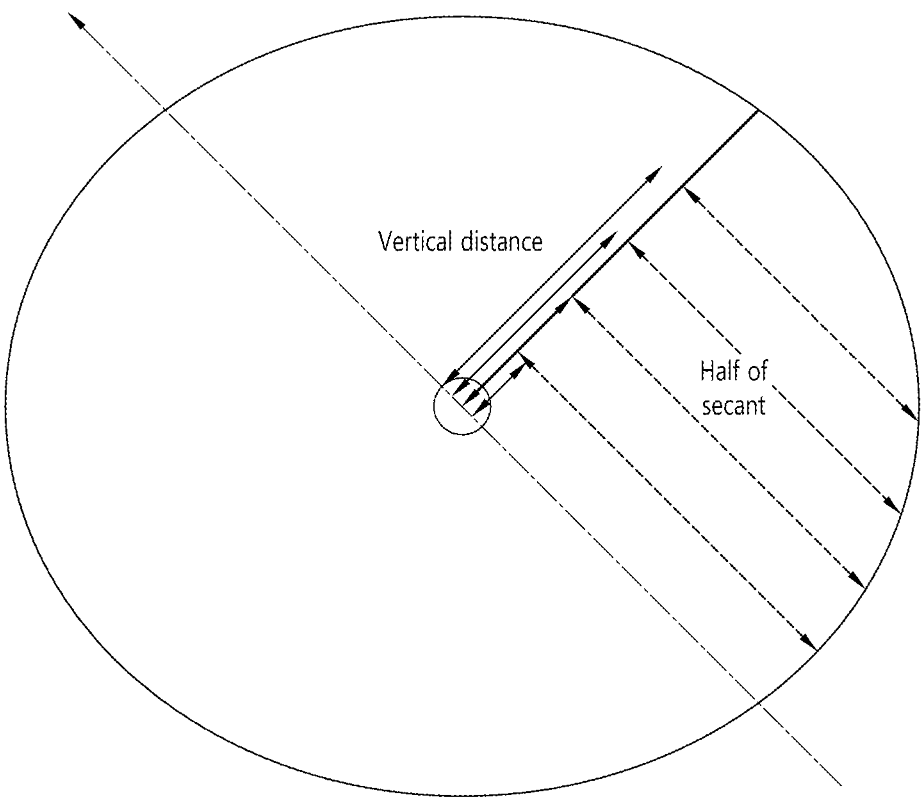
FIG. 18 shows examples of half of secant values mapped to each vertical distance range.

- The cell coverage information may be provided by the serving cell.
- The cell coverage information may include distance threshold.
- The cell coverage information may include cell reference point information.
  - The reference point information may include location information of the cell reference point by time or coordination information of the cell reference point by time.
  - The reference point information may include velocity of the cell reference point by time. The velocity may include the moving direction of the cell reference point.
  - The reference point information may include cell reference point trace. The cell reference point trace may be the straight line that represents the moving direction of the cell reference point. The cell reference point trace may be consist of two or more coordination and the straight line between the two coordination may be the cell reference point trace.
- The cell coverage information may include reference distance. If the distance between UE and the cell reference point is lower than the reference distance, the UE may perform measurement on the cell and the UE may perform cell reselection to the cell.
- The cell coverage information may include half of secant values.
  - Each half of secant values may be mapped with each vertical distance range. Each vertical distance range may be consist of lower boundary value and higher boundary value. The vertical distance range may be value range from the lower boundary value to the higher boundary value. The lower boundary value and higher boundary value may be a positive integer. Higher boundary value of a vertical distance range may be lower boundary value of another vertical distance range.
  - For example, the half of secant value may be 50 kilometers if vertical distance is 5~10 kilometers and the half of secant value may be 20 kilometers if vertical distance is 10~15 kilometers. FIGS. 16 and 18 below may be the example of mapping between half of secant values and vertical distance range.
- The UE may calculate real distance based on the cell coverage information. The real distance may be the distance between the cell reference point and UE location.
- The UE may calculate vertical distance based on the cell coverage information. The vertical distance may be the closest distance or perpendicular distance between the UE location and the cell reference point trace. In other words, the vertical distance may be the length of the perpendicular line from the UE location to the cell reference point trace.
- The UE may calculate the horizontal distance based on the cell coverage information, calculated real distance and vertical distance.
  - The horizontal distance may be calculated using Pythagorean Theorem. Based on the theorem, (real distance)^2 is equal to (vertical distance)^2+(horizontal distance)^2. In other words, the square of real distance is equal to the sum of (square of vertical distance) and (square of horizontal distance).
  - The horizontal distance may be the distance between cell reference point and the closest point from the UE location to the cell reference point trace. When a perpendicular line is drawn from the UE location to the cell reference point trace, the point which the perpendicular line and the cell reference point trace meet is the closest point from the UE location to the cell reference point trace.

The half of secant may be half of the length of a secant line within the cell coverage. The secant line may be parallel to the cell reference point trace and may pass the UE location.

In step S1402, the UE may proceed to the next step if the calculated real distance is lower than the distance threshold included in the cell coverage information.

In step S1403, based on which vertical distance range the calculated vertical distance in step S1401 is included, the UE may calculate mapped half of secant value from the vertical distance range.

For example, the half of secant value per vertical distance range may be provided in table 13 below. In this example, if the calculated distance range is 25 kilometers, then the half of the secant value may be 75 kilometers.

Table 13 shows an example of half of the secant values per vertical distance range.

TABLE 13

| Vertical distance range (km) | Half of secant value (km) |
|---|---|
| 0~10 | 100 |
| 10~20 | 90 |
| 20~30 | 75 |
| 30~40 | 55 |
| 40~50 | 30 |

In step S1404, the UE may calculate the remaining service trace as follows.

Alternative (1) If a cell reference point is getting closer to the UE (same as situation depicted in FIGS. 15 and 17):

(remaining service trace)=(half of secant)+(horizontal distance)

Alternative (2) If a cell reference point is getting further from the UE (remaining service trace)=(half of secant)−(horizontal distance)

In step S1405, based on the calculated remaining service trace, the UE may calculate the remaining service time.

The (remaining service time) may be equal to (remaining service trace)/(velocity of cell reference point).

That is, the remaining service time is calculated by dividing the remaining service trace by the velocity of the cell reference point.

In step S1406, based on the calculated remaining service time, the UE may perform the measurement and cell reselection to the cell.

Based on the remaining service time of each cell in a frequency, the UE may perform cell reselection to a cell whose remaining service time is the longest.

According to some embodiments of the present disclosure, a UE may receive cell coverage information which includes (1) distance threshold, (2) location of cell reference point, (3) velocity of cell reference point, (4) cell reference point trace, and (5) half of secant values. Each secant value may be mapped to the range of each vertical distance range. The UE may calculate real distance. The real distance may be a distance between UE and cell reference point. The UE may calculate vertical distance. The vertical distance may be a distance between UE and the closest point of cell reference trace from the UE. The UE may calculate half of secant value, based on which value range the calculated vertical distance is located in. The UE may calculate the remaining service trace based on calculated horizontal distance and calculated half of secant value. The UE may calculate the remaining service time based on calculated remaining service trace and velocity of the cell reference point. The UE may perform cell reselection to the cell based on the calculated remaining service time.

Some of the detailed steps shown in the examples of FIGS. 13 and 14 may not be essential steps and may be omitted. In addition to the steps shown in FIGS. 13 and 14, other steps may be added, and the order of the steps may vary. Some of the above steps may have their own technical meaning.

Figure 15:
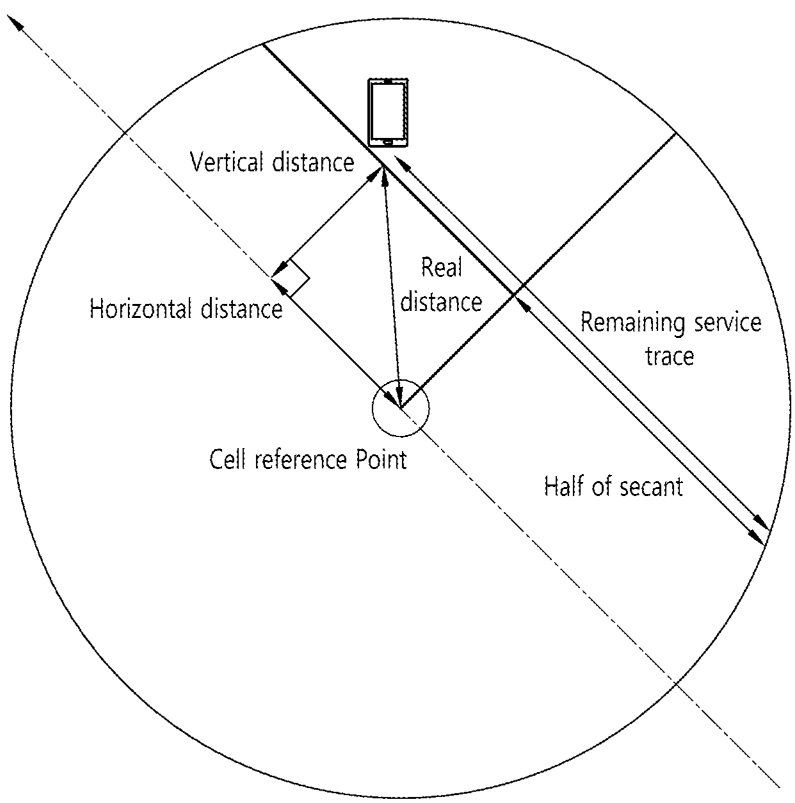
FIG. 15 shows an example of cell coverage information.

FIG. 15 shows an example of cell coverage information. In particular, FIG. 15 illustrates an example of the parameters included in the cell coverage information.

For example, a UE may receive the cell coverage information of FIG. 15, in step S1401 of FIG. 14.

FIG. 16 shows examples of half of secant values mapped to each vertical distance range.

For example, a UE may receive the half of secant values mapped to each vertical distance range of FIG. 16, in step S1401 of FIG. 14.

Although the shape of the NTN cell is represented as a circle in FIGS. 15 and 16, however, the present disclosure is not limited thereto. For example, the shape of the NTN cell is represented as an ellipse as described in FIGS. 17 and 18.

Figure 17:
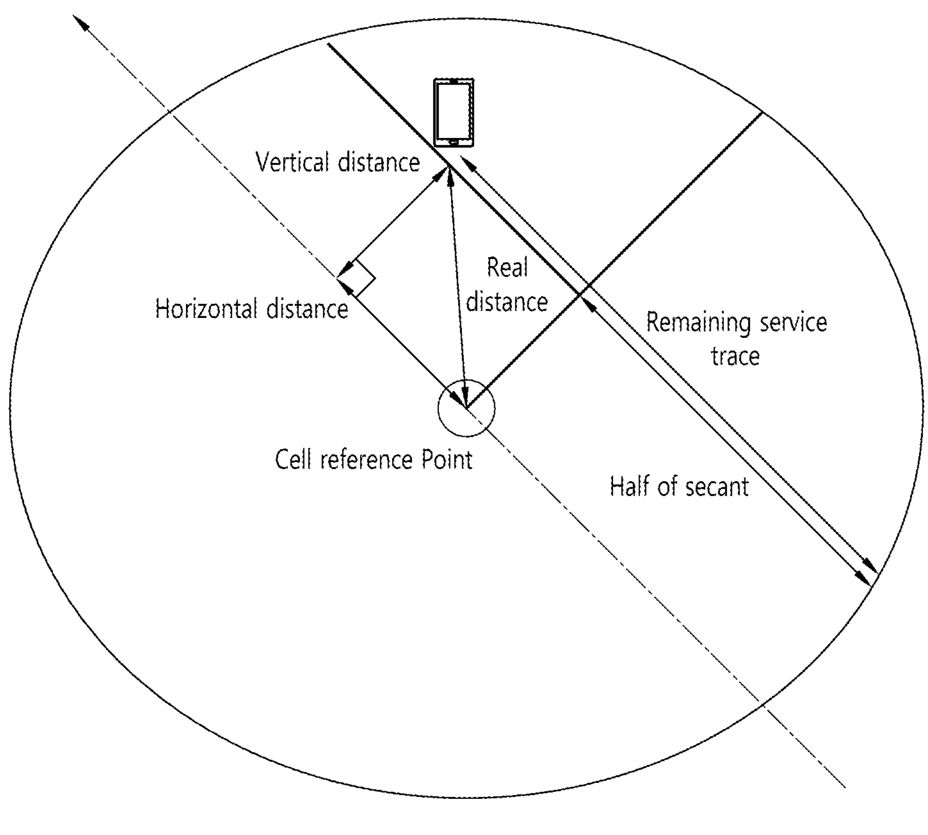
FIG. 17 shows another example of cell coverage information.

FIG. 17 shows another example of cell coverage information. In particular, FIG. 17 illustrates an example of the parameters included in the cell coverage information.

For example, a UE may receive the cell coverage information of FIG. 17, in step S1401 of FIG. 14.

FIG. 18 shows examples of half of secant values mapped to each vertical distance range.

For example, a UE may receive the half of secant values mapped to each vertical distance range of FIG. 18, in step S1401 of FIG. 14.

Referring to FIG. 18, the secant values mapped to each vertical distance range could vary depending on the shape of the ellipse (for example, the position of the major axis and minor axis, etc.).

In addition, unlike FIGS. 15 to 18, the shape of the NTN cell could be a shape different from that of a circle or an ellipse.

Therefore, according to the present disclosure, the wireless device can calculate the remaining service time using the information on the half of secant values mapped to each vertical distance range.

Hereinafter, an apparatus for evaluating service time for an NTN cell in a wireless communication system, according to some embodiments of the present disclosure, will be described. Herein, the apparatus may be a wireless device (100 or 200) in FIGS. 2, 3, and 5.

For example, a wireless device may perform the methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range. The processor 102 may be configured to calculate a remaining service trace based on (1) a secant value, among the one or more secant values, corresponding to a vertical distance between the wireless device and the trace of the reference point and (2) a horizontal distance between the wireless device and the reference point. The processor 102 may be configured to evaluate remaining service time for the NTN cell based on the remaining service trace and a velocity of the reference point. The processor 102 may be configured to determine whether to perform a mobility to the NTN cell based on the remaining service time.

For example, the cell coverage information may include information on a distance threshold.

For example, the processor 102 may be configured to determine whether a distance between the wireless device and the reference point is lower than or equal to the distance threshold.

For example, the step of calculating the remaining service and the step of evaluating the remaining service time are initiated based on determining that the distance between the wireless device and the reference point is lower than or equal to the distance threshold.

For example, the cell coverage information may include information on the velocity of the reference point.

For example, the horizontal distance between the wireless device and the reference point may be calculated from (1) a distance between the wireless device and the reference point and (2) the vertical distance between the wireless device and the trace of the reference point.

For example, the mobility to the NTN cell may include a cell reselection to the NTN cell. For example, the processor 102 may be configured to compare the remaining service time of the NTN cell with other NTN cells. The processor 102 may be configured to perform the cell reselection based on that the remaining service time of the NTN cell is the longest.

For example, the processor 102 may be configured to perform measurement on the NTN cell based on the remaining service time.

For example, the remaining service trace may be calculated by adding the horizontal distance to half of the secant value corresponding to the vertical distance, based on that the reference point is getting closer to the wireless device.

For example, the remaining service trace may be calculated by subtracting the horizontal distance from half of the secant value corresponding to the vertical distance, based on that the reference point is getting further from the wireless device.

For example, the remaining service time may be calculated by dividing the remaining service trace by the velocity of the reference point.

According to some embodiments of the present disclosure, the processor 102 may be configured to be in communication with at least one of a user equipment, a network, or an autonomous vehicle other than the wireless device.

Hereinafter, a processor for a wireless device for evaluating service time for an NTN cell in a wireless communication system, according to some embodiments of the present disclosure, will be described.

The processor may be configured to control the wireless device to receive, from a network, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range. The processor may be configured to control the wireless device to calculate a remaining service trace based on (1) a secant value, among the one or more secant values, corresponding to a vertical distance between the wireless device and the trace of the reference point and (2) a horizontal distance between the wireless device and the reference point. The processor may be configured to control the wireless device to evaluate remaining service time for the NTN cell based on the remaining service trace and a velocity of the reference point. The processor may be configured to control the wireless device to determine whether to perform a mobility to the NTN cell based on the remaining service time.

For example, the cell coverage information may include information on a distance threshold.

For example, the processor may be configured to control the wireless device to determine whether a distance between the wireless device and the reference point is lower than or equal to the distance threshold.

For example, the step of calculating the remaining service and the step of evaluating the remaining service time are initiated based on determining that the distance between the wireless device and the reference point is lower than or equal to the distance threshold.

For example, the cell coverage information may include information on the velocity of the reference point.

For example, the horizontal distance between the wireless device and the reference point may be calculated from (1) a distance between the wireless device and the reference point and (2) the vertical distance between the wireless device and the trace of the reference point.

For example, the mobility to the NTN cell may include a cell reselection to the NTN cell. For example, the processor may be configured to control the wireless device to compare the remaining service time of the NTN cell with other NTN cells. The processor may be configured to control the wireless device to perform the cell reselection based on that the remaining service time of the NTN cell is the longest.

For example, the processor may be configured to control the wireless device to perform measurement on the NTN cell based on the remaining service time.

For example, the remaining service trace may be calculated by adding the horizontal distance to half of the secant value corresponding to the vertical distance, based on that the reference point is getting closer to the wireless device.

For example, the remaining service trace may be calculated by subtracting the horizontal distance from half of the secant value corresponding to the vertical distance, based on that the reference point is getting further from the wireless device.

For example, the remaining service time may be calculated by dividing the remaining service trace by the velocity of the reference point.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for evaluating service time for an NTN cell in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For another example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range. The stored a plurality of instructions may cause the wireless device to calculate a remaining service trace based on (1) a secant value, among the one or more secant values, corresponding to a vertical distance between the wireless device and the trace of the reference point and (2) a horizontal distance between the wireless device and the reference point. The stored a plurality of instructions may cause the wireless device to evaluate remaining service time for the NTN cell based on the remaining service trace and a velocity of the reference point. The stored a plurality of instructions may cause the wireless device to determine whether to perform a mobility to the NTN cell based on the remaining service time.

For example, the cell coverage information may include information on a distance threshold.

For example, the stored a plurality of instructions may cause the wireless device to determine whether a distance between the wireless device and the reference point is lower than or equal to the distance threshold.

For example, the step of calculating the remaining service and the step of evaluating the remaining service time are initiated based on determining that the distance between the wireless device and the reference point is lower than or equal to the distance threshold.

For example, the cell coverage information may include information on the velocity of the reference point.

For example, the horizontal distance between the wireless device and the reference point may be calculated from (1) a distance between the wireless device and the reference point and (2) the vertical distance between the wireless device and the trace of the reference point.

For example, the mobility to the NTN cell may include a cell reselection to the NTN cell. For example, the stored a plurality of instructions may cause the wireless device to compare the remaining service time of the NTN cell with other NTN cells. The stored a plurality of instructions may cause the wireless device to perform the cell reselection based on that the remaining service time of the NTN cell is the longest.

For example, the stored a plurality of instructions may cause the wireless device to perform measurement on the NTN cell based on the remaining service time.

For example, the remaining service trace may be calculated by adding the horizontal distance to half of the secant value corresponding to the vertical distance, based on that the reference point is getting closer to the wireless device.

For example, the remaining service trace may be calculated by subtracting the horizontal distance from half of the secant value corresponding to the vertical distance, based on that the reference point is getting further from the wireless device.

For example, the remaining service time may be calculated by dividing the remaining service trace by the velocity of the reference point.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for service time for an NTN cell in a wireless communication system, according to some embodiments of the present disclosure, will be described.

The BS may transmit, to a wireless device, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range.

Hereinafter, a base station (BS) for service time for an NTN cell in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range.

The present disclosure can have various advantageous effects.

According to some embodiments of the present disclosure, a wireless device could efficiently evaluate service time for an NTN cell in a wireless communication system.

For example, a wireless device could select a neighbor cell for cell reselection by evaluating the remaining service time period. In particular, if the time condition exists in a cell (or a frequency), the wireless device could calculate the remaining service time for the cell (or the frequency).

For example, a wireless device can calculate the expected remaining service time based on location information of the wireless device and cell coverage information. Based on the calculated remaining service time, the wireless device can perform measurement or cell reselection to the cell.

For example, a wireless device could evaluate the remaining service time period using only location information. That is, the wireless device could determine a neighbor cell to perform cell reselection only using the location information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method, comprising, receiving, by a wireless device from a network, information related to non-terrestrial network access, wherein the information related to non-terrestrial network access includes (1) information related to a location of a reference point for a non-terrestrial network NTN cell by time, (2) information related to a trace of a reference point for the non-terrestrial network cell, and (3) information related to one or more secant values per vertical distance range;

calculating, by the wireless device, a remaining service trace based on (4) a secant value, among the one or more secant values, corresponding to a vertical distance between the wireless device and the trace of the reference point and (5) a horizontal distance between the wireless device and the reference point;

evaluating, by the wireless device, remaining service time for the non-terrestrial network cell based on the remaining service trace and a velocity of the reference point; and determining, by the wireless device, whether to perform a mobility to the non-terrestrial network cell based on the remaining service time.

2. The method of claim 1, wherein the cell coverage information includes information on a distance threshold.

3. The method of claim 2, wherein the method further comprises, determining, by the wireless device, whether a distance between the wireless device and the reference point is lower than or equal to the distance threshold.

4. The method of claim 3, wherein the step of calculating the remaining service trace and the step of evaluating the remaining service time are initiated based on determining that the distance between the wireless device and the reference point is lower than or equal to the distance threshold.

5. The method of claim 1, wherein the cell coverage information includes information on the velocity of the reference point.

6. The method of claim 1, wherein the horizontal distance between the wireless device and the reference point is calculated from a distance between the wireless device and the reference point and the vertical distance between the wireless device and the trace of the reference point.

7. The method of claim 1, wherein the mobility to the non-terrestrial network cell includes a cell reselection to the non-terrestrial network cell.

8. The method of claim 7, wherein the method further comprises, comparing, by the wireless device, the remaining service time of the non-terrestrial network cell with other non-terrestrial network cells; and performing, by the wireless device, the cell reselection based on that the remaining service time of the NTN cell is the longest.

9. The method of claim 1, wherein the method further comprises, performing, by the wireless device, measurement on the non-terrestrial network cell based on the remaining service time.

10. The method of claim 1, wherein the remaining service trace is calculated by adding the horizontal distance to half of the secant value corresponding to the vertical distance, based on that the reference point is getting closer to the wireless device.

11. The method of claim 1, wherein the remaining service trace is calculated by subtracting the horizontal distance from half of the secant value corresponding to the vertical distance, based on that the reference point is getting further from the wireless device.

12. The method of claim 1, wherein the remaining service time is calculated by dividing the remaining service trace by the velocity of the reference point.

13. The method of claim 1, wherein the wireless device is in communication with at least one of a user equipment, a network, or an autonomous vehicle other than the wireless device.

14. A wireless device in a wireless communication system comprising:

a transceiver;

a memory; and at least one processor operatively coupled to the transceiver and the memory, and configured to perform operations, the operations comprising:

receiving, from a network, information related to non-terrestrial network access, wherein the information related to non-terrestrial network access includes (1) information related to a location of a reference point for a non-terrestrial network cell by time, (2) information related to a trace of a reference point for the non-terrestrial network cell, and (3) information related to one or more secant values per vertical distance range;

calculating a remaining service trace based on (4) a secant value, among the one or more secant values, corresponding to a vertical distance between the wireless device and the trace of the reference point and (5) a horizontal distance between the wireless device and the reference point;

evaluating remaining service time for the non-terrestrial network cell based on the remaining service trace and a velocity of the reference point; and determining whether to perform a mobility to the non-terrestrial network cell based on the remaining service time.

15. The wireless device of claim 14, wherein the cell coverage information includes information on a distance threshold.

16. The wireless device of claim 15, wherein the at least one processor is further configured to, determine whether a distance between the wireless device and the reference point is lower than or equal to the distance threshold.

17. The wireless device of claim 16, wherein the step of calculating the remaining service trace and the step of evaluating the remaining service time are initiated based on determining that the distance between the wireless device and the reference point is lower than or equal to the distance threshold.

18. The wireless device of claim 14, wherein the cell coverage information includes information on the velocity of the reference point.

19. The wireless device of claim 14, wherein the horizontal distance between the wireless device and the reference point is calculated from a distance between the wireless device and the reference point and the vertical distance between the wireless device and the trace of the reference point.

20. A base station in a wireless communication system comprising:

a transceiver;

a memory; and a processor operatively coupled to the transceiver and the memory, and configured to:

control the transceiver to transmit, to a wireless device, cell coverage information for a Non-Terrestrial Networks (NTN) cell including (1) information on a location of a reference point for the NTN cell by time, (2) information on a trace of a reference point for the NTN cell, and (3) information on one or more secant values per vertical distance range.

* * * * *